Aug. 2, 1932. H. C. NORLEY 1,870,135
DRILL
Filed Dec. 11, 1931
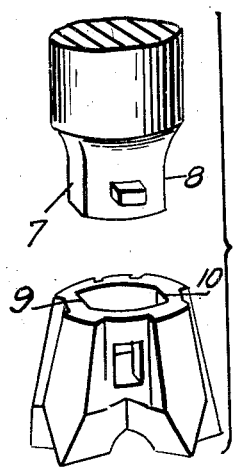
FIG.9.
FIG.1.
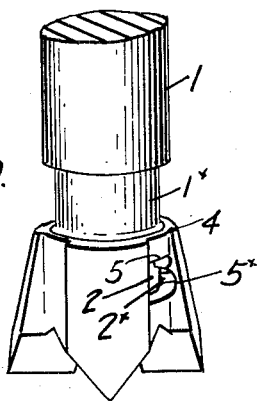
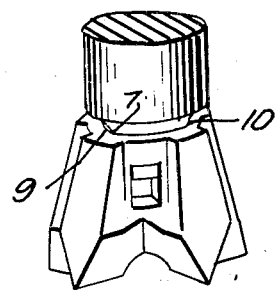
FIG.8.
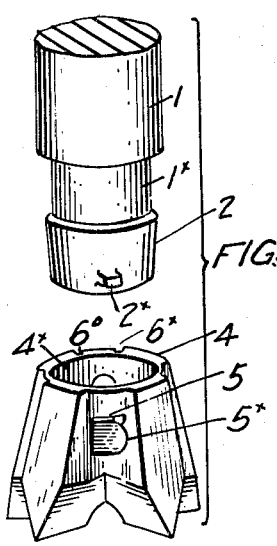
FIG.3.
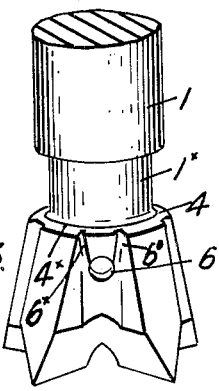
FIG.2.
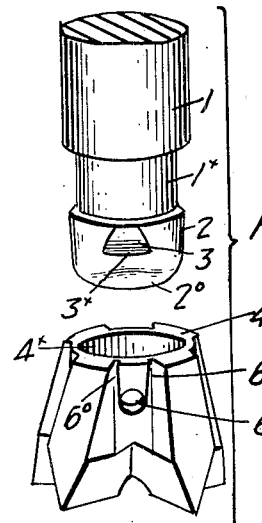
FIG.4.
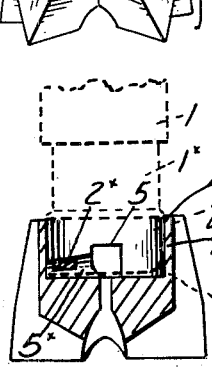
FIG.6.
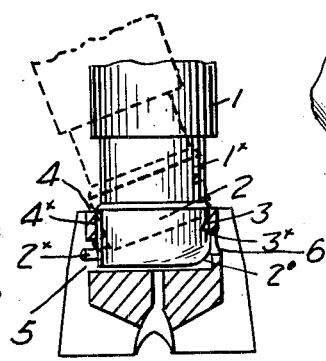
FIG.5.
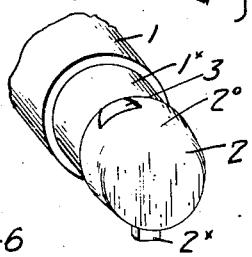
FIG.7.
INVENTOR
H.C. NORLEY.
BY
ATTORNEYS Patented Aug. 2, 1932

1,870,135

UNITED STATES PATENT OFFICE

HARRY CHARLES NORLEY, OF NORTH BAY, ONTARIO, CANADA, ASSIGNOR TO CANADIAN ATLAS STEELS LIMITED, OF WELLAND, ONTARIO, CANADA, A COMPANY INCORPORATED UNDER THE COMPANIES ACT OF CANADA

DRILL

Application filed December 11, 1931. Serial No. 580,421.

My invention relates to improvements in drills, and the object of the invention is to devise a connector for small bits which will dispense with the use of a split spring ring or clip more particularly adaptable to large bits and as covered in my previously filed applications No. 563,835 filed September 9th, 1931, and No. 574,880, filed November 13th, 1931, and it consists essentially of the arrangement and construction of parts as hereinafter more particularly explained.

Fig. 1 is a perspective view of a portion of a drill shank and bit connected together in accordance with my invention.

Fig. 2 is a similar view to Fig. 1 showing the reverse side of the bit.

Fig. 3 is a similar view to Fig. 1 showing the shank and bit separated apart.

Fig. 4 is a similar view to Fig. 3 looking from the side illustrated in Fig. 2.

Fig. 5 is a sectional view through the bit and showing the shank in full.

Fig. 6 is a sectional view through the bit taken at right angles to Fig. 5 and showing the shank by dotted lines.

Fig. 7 is a perspective view of the shank looking at the bottom end thereof.

Figs. 8 and 9 illustrate a modification.

In the drawing like characters of reference indicate corresponding parts in each figure.

1 indicates the drill shank provided with a reduced lower end $1^x$ provided with a slightly tapered cylindrical head 2 having a radial projection $2^x$ extending from one side thereof adjacent its lower edge such lower edge at the opposite side of the head being rounded off as indicated at $2°$ and with a ratchet notch 3, the lower face of the ratchet being presented upward as indicated at $3^x$.

4 is a drill bit having a recess $4^x$ into which the head 2 of the shank 1 fits. The wall at one side of the recess $4^x$ is provided between a pair of bit teeth with a slotted opening 5 from which extends in a counter clockwise direction a downwardly inclined groove $5^x$. The diametrically opposite side of the wall $4^x$ is provided with an orifice 6 from which extends slightly diverging grooves $6^x$ and $6°$ for a purpose which will hereinafter appear.

In attaching the bit the shank is initially set at an angle to the bit as indicated by dotted lines in Fig. 5, the projection $2^x$ entering the opening 5 and engaging the upper edge thereof and the rounded edge $2°$ engaging the diametrically opposite edge of the recess $4^x$.

The shank and bit are then driven together so that the rounded edge $2°$ is sprung into the recess assuming the full line position of Fig. 5. The shank is then turned in a counter clockwise direction carrying the projection $2^x$ into the groove $5^x$ to have wedging engagement with the upper inclined face of the groove. A set is then employed to drive in that portion of the recess wall enclosed by the orifice 6 and groove $5^x$ to engage the face $3^x$ of the ratchet notch 3 thereby positively locking the parts together to prevent jumping up and down from impact of the mine drilling machine.

In Figs. 8 and 9 I illustrate a modification in which the cam groove $5^x$ is dispensed with and flat sided portions 7 and 8 provided which engage correspondingly flat sided portions 9 and 10 in the bit. The bit and shank are otherwise formed to correspond with the construction shown in Figs. 1 to 7 inclusive being engaged and locked in the same manner as that illustrated in Fig. 5.

From this description it will be seen that I have devised a very simple form of connection between a drill shank and bit which may be positively locked in place without the employment of a spring clip or other separate part.

What I claim as my invention is:

1. The combination with the drill shank and bit engaging means rotatably connecting the shank and bit together, and means incorporated in the structure of the shank and bit for positively locking the shank and bit in the engaged position, such locking means comprising a recess formed in the shank, an inwardly settable portion forming part of the bit for engaging the recess.

2. The combination with the drill shank and bit having a shank receiving recess into which the end of the shank fits, engaging means rotatably connecting the shank and bit together, and means incorporated in the structure of the shank and bit for positively locking the shank and bit in the engaged position such locking means comprising a recess formed in the shank, and lines of weakness formed in the wall of the shank receiving recess to permit the inward setting of a portion of the shank receiving recess wall to engage the recess of the shank.

3. In combination a drill shank provided with a projection extending from the periphery thereof and at its diametrically opposite side with a rounded end edge portion, and a bit recessed to receive the cylindrical portion of the shank having an orifice in the wall thereof to receive the shank projection and an interior inclined groove into which the projection enters to engage by rotation of the shank, and means for locking the bit upon the shank against reverse rotation.

4. The combination with a bit having a shank receiving recess having an orifice in the wall thereof, a shank having a peripheral projection adapted to partially enter the orifice of the bit when the axis of the shank is set at an angle to the axis of the bit and to fully enter the orifice as said axes are swung to a parallel position as the shank end enters the recess, and means at the diametrically opposite side of the shank and bit to said projection for locking the parts in the engaged position.

5. The combination with a bit having a shank receiving recess, a shank, engaging means between the side of the shank end and the wall of the recess adapted to partially engage when the axis of the shank is set at an angle to the axis of the bit as the shank end enters the bit recess and to fully engage as said axes are swung to a parallel position, and means on the diametrically opposite side of the shank and bit for locking the parts in the fully engaged position.

HARRY CHARLES NORLEY.